United States Patent
Luo

(10) Patent No.: US 8,908,044 B2
(45) Date of Patent: Dec. 9, 2014

(54) ELECTRONIC DEVICE CAPABLE OF DETECTING ULTRAVIOLENT RADIATION AND METHOD THEREOF

(75) Inventor: Wen-Dong Luo, Shenzhen (CN)

(73) Assignees: Fu Tai Hua Industry (Shenzhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 327 days.

(21) Appl. No.: 13/565,774

(22) Filed: Aug. 2, 2012

(65) Prior Publication Data
US 2013/0155252 A1    Jun. 20, 2013

(30) Foreign Application Priority Data
Dec. 15, 2011   (CN) .......................... 2011 1 0420825

(51) Int. Cl.
H04N 5/30 (2006.01)
(52) U.S. Cl.
USPC ......................................... 348/162; 348/734
(58) Field of Classification Search
USPC ............... 348/162, 163, 164, 151, 734
IPC ........................................................ H04N 5/30
See application file for complete search history.

(56) References Cited

U.S. PATENT DOCUMENTS

| | | | |
|---|---|---|---|
| 2009/0091621 A1* | 4/2009 | Chen et al. | 348/162 |
| 2009/0268031 A1* | 10/2009 | Honma et al. | 348/162 |
| 2010/0321501 A1* | 12/2010 | Arndt | 348/162 |
| 2013/0250122 A1* | 9/2013 | Binder | 348/162 |

* cited by examiner

*Primary Examiner* — Trang U Tran
(74) *Attorney, Agent, or Firm* — Novak Druce Connolly Bove + Quigg LLP

(57) ABSTRACT

An electronic device capable of detecting ultraviolent radiation and a method thereof are provided. The device includes a camera, a voltage-sensitive optical medium, a control switch, and a processor. When the electronic device enters an ultraviolent radiation detecting mode, the camera captures a first image. The processor controls the control switch to create an electrical potential across the optical medium and cause it to become darker after the camera captures the first image. The camera captures a second image after the control switch has allowed an electrical potential for a first preset time interval. The processor acquires reads the respective brightness of the first image and the second image, determines any difference, and determines and outputs the level of intensity of the ultraviolet radiation intensity by reference to a table of differences.

14 Claims, 4 Drawing Sheets

ELECTRONIC DEVICE CAPABLE OF DETECTING ULTRAVIOLENT RADIATION AND METHOD THEREOF

BACKGROUND

1. Technical Field

The disclosure relates to electronic devices and, more particularly, to an electronic device capable of detecting ultraviolent radiation and a method for detecting ultraviolent radiation adapted for the electronic device.

2. Description of Related Art

Many electronic devices, such as mobile phones, have an ultraviolent radiation detecting function, but the detecting method used in such devices is often complex.

Therefore, what is needed is a new electronic device to overcome the described shortcoming

DETAILED DESCRIPTION

Figure 1:
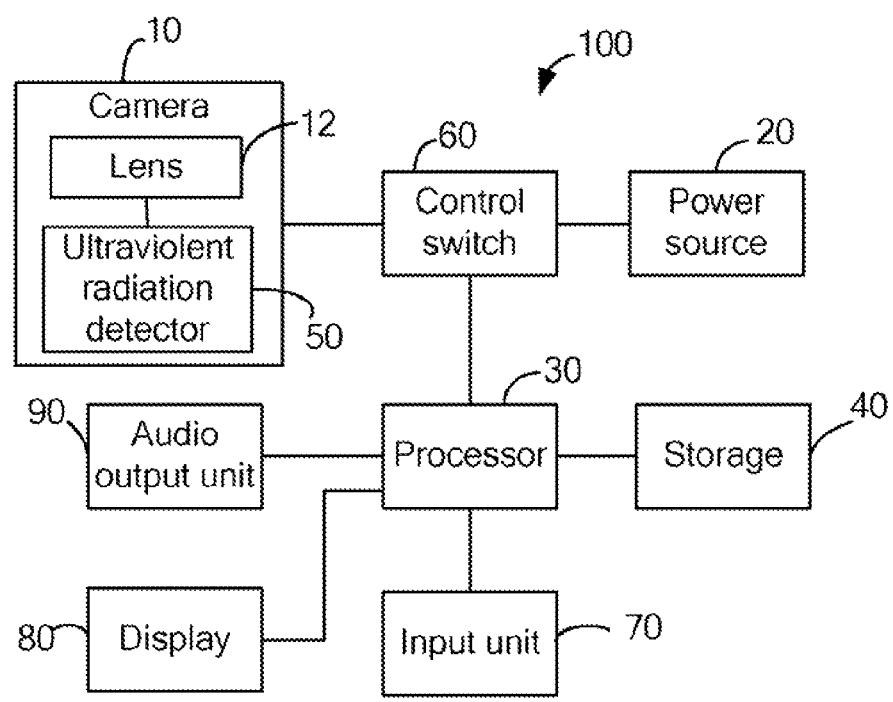
FIG. 1 is a block diagram of an electronic device capable of detecting ultraviolent radiation in accordance with an exemplary embodiment.
Figure 2:
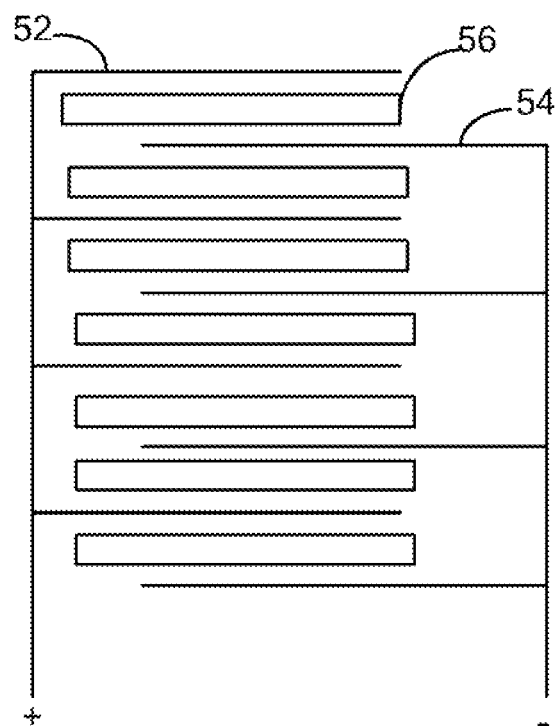
FIG. 2 is a schematic diagram of an ultraviolent radiation detector of the electronic device of FIG. 1.

Referring to FIGS. 1 and 2, an electronic device for detecting ultraviolent radiation (hereinafter "the electronic device") 100 includes a camera 10, a power source 20, a processor 30, a storage 40, and a control switch 60. The camera 10 includes a lens 12 and an ultraviolent radiation detector 50. The ultraviolent radiation detector 50 is mounted on the lens 12 and includes a positive electrode 52, a negative electrode 54, and a transparent medium 56 distributed between the positive electrode 52 and the negative electrode 54.

The power source 20 provides power for the electronic device 100. The control switch 60 is connected between the power source 20 and the ultraviolent radiation detector 50. Both the positive electrode 52 and the negative electrode 54 are connected to the power source 20 and to the processor 30 via the control switch 60. When the control switch 60 is switched off and power is not supplied to the electrodes 52 and 54, the transparent medium 56 is transparent. When the control switch 60 is switched on and power is supplied to the electrodes 52 and 54, a voltage drop is generated between the positive electrode 52 and the negative electrode 54 and the transparent medium 56 becomes dark due to the voltage drop. The control switch 60 may be a CMOS transistor or a triode.

Figure 3:
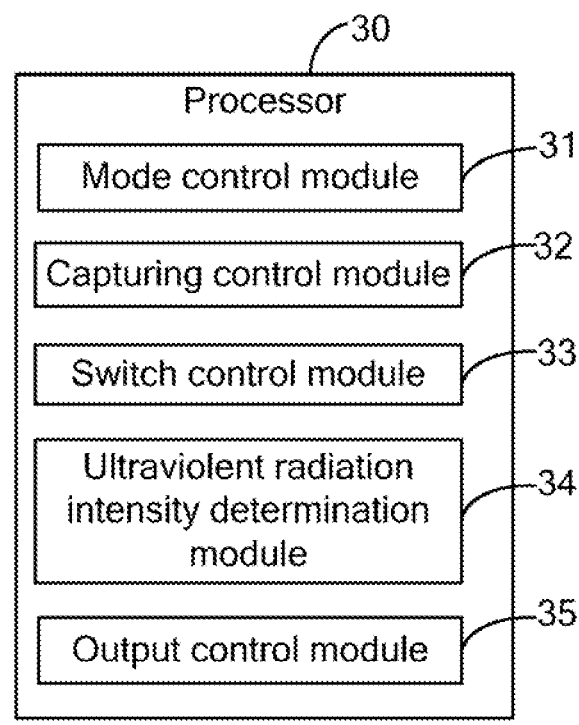
FIG. 3 is a block diagram of a control unit of the electronic device of FIG. 1.

As shown in FIG. 3, the processor 30 includes a mode control module 31, a capturing control module 32, a switch control module 33, and an ultraviolent radiation intensity determination module 34. The electronic device 100 defines a normal operation mode and an ultraviolent radiation detecting mode. The mode control module 31 controls the electronic device 100 to enter the ultraviolent radiation detecting mode. For example, in an exemplary embodiment, the mode control module 31 further controls the electronic device 100 to enter the ultraviolent radiation detecting mode at preset time intervals. In another exemplary embodiment, the electronic device 100 further includes an input unit 70, and the mode control module 31 further controls the electronic device 100 to enter the ultraviolent radiation detecting mode in response to user inputs from the input unit 70.

The mode control module 31 controls the electronic device 100 to enter the normal mode by default, and the switch control module 33 controls the control switch 60 to withhold power. When the electronic device 100 enters the ultraviolent radiation detecting mode, the capturing control module 32 controls the camera 10 to capture a first image in the front of the electronic device 100 and stores the first image in the storage 40. The switch control module 33 controls the control switch 60 to supply power after the camera 10 captures the first image, and the voltage drop is generated between the positive electrode 52 and the negative electrode 54. The capturing control module 32 further controls the camera 10 to capture a second image in the front of the electronic device 100 and stores the second image after power has been supplied to the electrodes 52 and 54 for a second preset time interval.

The ultraviolent radiation intensity determination module 34 acquires the brightness of the first image and the second image, determines any difference between the brightness of the first image and the second image, and determines the intensity of any ultraviolent radiation received according to the difference between the brightness of the first image and the second image. In the embodiment, the storage 40 stores a relationship table recording relationships between the brightness differences and ultraviolent radiation intensities. The ultraviolent radiation intensity determination module 34 further determines the actual level of intensity of ultraviolent radiation received according to the position of the brightness difference in the relationship table.

In a second exemplary embodiment, the electronic device 100 further includes a display 80, and the processor 30 further includes an output control module 35. The output control module 35 controls the display 80 to display the intensity of ultraviolent radiation. In a third exemplary embodiment, the electronic device 100 further includes an audio output unit 90, and the processor 30 further includes an output control module 35. The output control module 35 controls the audio output unit 90 to output the intensity of ultraviolent radiation in audible form.

Furthermore, the switch control module 33 further controls the control switch 60 to power off after the ultraviolent radiation intensity determination module 34 has determined the intensity of ultraviolent radiation. Therefore, after the control switch 60 withholds power, there is no voltage drop between the positive electrode 52 and the negative electrode 54, both the positive electrode 52 and the negative electrode 54 lose their charge, and the transparent medium 56 regains its transparency.

Figure 4:
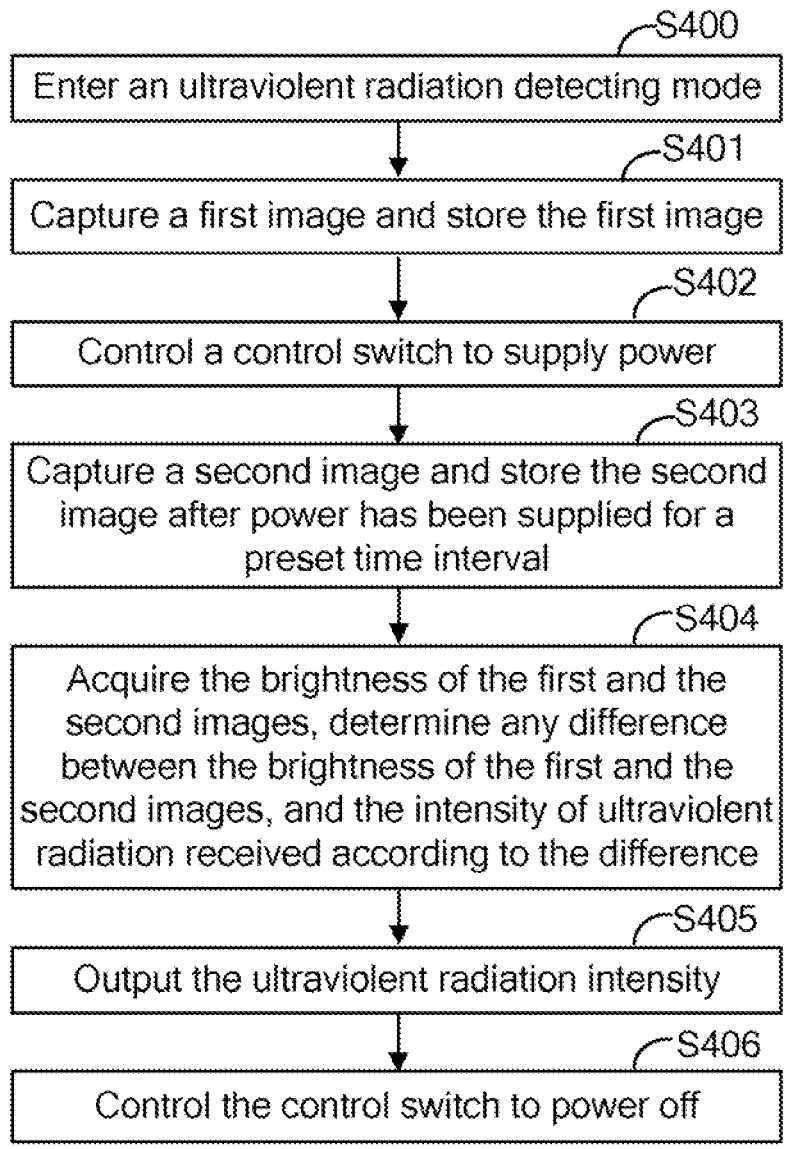
FIG. 4 is a flowchart of a method for detecting ultraviolent radiation adapted for the electronic device of FIG. 1.

FIG. 4 is a flowchart of a method for detecting ultraviolent radiation adapted for the electronic device of FIG. 1.

In step S400, the mode control module 31 controls the electronic device 100 to enter an ultraviolent radiation detecting mode. In Step S401, when the electronic device 100 enters the ultraviolent radiation detecting mode, the capturing control module 32 controls the camera 10 to capture a first image in the front of the electronic device 100 and stores the first image in the storage 40.

In step S402, the switch control module 33 controls the control switch 60 to supply power and the voltage drop is generated between the positive electrode 52 and the negative electrode 54. In step S403, the capturing control module 32 further controls the camera 10 to capture a second image in the front of the electronic device 100 and stores the second image after power has been supplied to the electrodes 52 and 54 for the second preset time interval.

In step S404, the ultraviolent radiation intensity determination module 34 acquires and reads the brightness of the first image and the second image, determines any difference between the brightness of the first image and the second image, and determines the intensity of any ultraviolent radiation received according to the difference between the brightness of the first image and the second image.

In step S405, the output control module 35 controls the display 80 or the audio output unit 90 to output an indication of the ultraviolent radiation intensity. In step S406, the switch control module 33 controls the control switch 60 to power off and the procedure ends.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device for detecting ultraviolent radiation, comprising:
a camera comprising:
a lens; and
an ultraviolent radiation detector mounted on the lens and comprising a positive electrode, a negative electrode, and a transparent medium distributed between the positive electrode and the negative electrode;
a control switch connected between the ultraviolent radiation detector and a power source, wherein both the positive electrode and the negative electrode are connected to the power source via the control switch, when the control switch is switched on and power is supplied to the positive electrode and the negative electrode, a voltage drop is generated between the positive electrode and the negative electrode and the transparent medium becomes dark due to the voltage drop; and
a processor comprising:
a mode control module to control the electronic device to enter an ultraviolent radiation detecting mode;
a capturing control module to control the camera to capture a first image in the front of the electronic device and store the first image when the electronic device enters the ultraviolent radiation detecting mode, and capture a second image in the front of the electronic device and store the second image after power has been supplied to the positive electrode and the negative electrode for a first preset time interval;
a switch control module to control the control switch to supply power after the camera captures the first image; and
an ultraviolent radiation intensity determination module to acquire the brightness of the first image and the second image, determine any difference between the brightness of the first image and the second image, and determine the intensity of ultraviolent radiation received according to the difference between the brightness of the first image and the second image.

2. The electronic device as recited in claim 1, wherein the electronic device stores a relationship table recording relationships between the brightness differences and the ultraviolent radiation intensities, the ultraviolent radiation intensity determination module is configured to determine the actual level of intensity of ultraviolent radiation according to the position of the brightness difference in the relationship table.

3. The electronic device as recited in claim 1, further comprising a display, wherein the processor further comprises an output control module to control the display to display the intensity of ultraviolent radiation.

4. The electronic device as recited in claim 1, further comprising an audio output unit, wherein the processor further comprises an output control module to control the audio output unit to output the intensity of ultraviolent radiation in audible form.

5. The electronic device as recited in claim 1, wherein the switch control module is further configured to control the control switch to power off after the ultraviolent radiation intensity determination module has determined the intensity of ultraviolent radiation.

6. The electronic device as recited in claim 1, wherein the mode control module is further configured to control the electronic device to enter the ultraviolent radiation detecting mode at second preset time intervals.

7. The electronic device as recited in claim 1, further comprising an input unit, wherein the mode control module is further configured to control the electronic device to enter the ultraviolent radiation detecting mode in response to user inputs from the input unit.

8. A method of detecting ultraviolent radiation for an electronic device, wherein the electronic device comprises a camera, a power source, and a control switch, the camera further comprises a lens and an ultraviolent radiation detector mounted on the lens, the ultraviolent radiation detector further comprises a positive electrode, a negative electrode, and a transparent medium distributed between the positive electrode and the negative electrode, the control switch is connected between the power source and the ultraviolent radiation detector, both the positive electrode and the negative electrode are connected to the power source via the control switch, when the control switch is switched on and power is supplied to the positive electrode and the negative electrode, a voltage drop is generated between the positive electrode and the negative electrode and the transparent medium becomes dark due to the voltage drop; the method comprising:
controlling the electronic device to enter an ultraviolent radiation detecting mode;
controlling the camera to capture a first image in the front of the electronic device and storing the first image;
controlling the control switch to supply power after the camera captures the first image;
controlling the camera to capture a second image in the front of the electronic device and storing the second image after power has been supplied to the positive electrode and the negative electrode for a first preset time interval; and
acquiring the brightness of the first image and the second image, determining any difference between the brightness of the first image and the second image, and determining the intensity of ultraviolent radiation according to the difference between the brightness of the first image and the second image.

9. The method as recited in claim 8, wherein the electronic device stores a relationship table recording relationships between the brightness differences and the ultraviolent radiation intensities, the step of determining the intensity of ultraviolent radiation according to the difference between the brightness of the first image and the second image comprises:
determining the actual level of intensity of ultraviolent radiation according to the position of the brightness difference in the relationship table.

10. The method as recited in claim 8, further comprising:
displaying the ultraviolent radiation intensity.

11. The method as recited in claim 8, further comprising:
outputting the ultraviolent radiation intensity in audible form.

12. The method as recited in claim 8, further comprising:
controlling the control switch to power off after determining the intensity of ultraviolent radiation.

13. The method as recited in claim 8, further comprising:
controlling the electronic device to enter the ultraviolent radiation detecting mode at second preset time intervals.

14. The method as recited in claim 8, further comprising:
controlling the electronic device to enter the ultraviolent radiation detecting mode in response to user inputs.

* * * * *